United States Patent

[11] 3,601,585

[72] Inventor  Dan B. Paulsen
               36505 Oak St., Fremont, Calif. 94546
[21] Appl. No. 760,527
[22] Filed     Sept. 18, 1968
[45] Patented  Aug. 24, 1971

[54] METHOD AND APPARATUS FOR TOTALIZING MATERIALS FROM CONSTRUCTION DRAWINGS
6 Claims, 6 Drawing Figs.

[52] U.S. Cl. .................................................. 235/92 DN,
                                                     235/92 R, 235/92 PE
[51] Int. Cl. ................................................. G06m 1/272,
                                                            G06m 3/02
[50] Field of Search ........................................... 235/92

[56]              References Cited
               UNITED STATES PATENTS
3,342,979  9/1967  Wright .......................  235/92
2,403,873  7/1946  Mumma .....................  177/380

Primary Examiner—Maynard R. Wilbur
Assistant Examiner—Robert F. Gnuse
Attorney—Warren, Rubin, Brucker & Chickering ABSTRACT: In order to accumulate the total amount of required electrical materials for estimating the cost of electrical facilities for a designed building, the length of all conduit runs obtained from a sealed electrical construction drawing are converted into a proportional number of electrical pulses by a rotameter. Each pulse thereby provided is employed to generate a selected multiple number of pulses by appropriately gating the output of a high frequency pulse generator wherein the number of pulses thus gated is selected to be proportional to the number of conductors carried by each conduit run. The resulting gated pulses are accumulated by a pulse counter accumulator which thereby registers a number proportional to the total conductor length for all of the conduit runs displayed by the construction drawing. In addition to the accumulation of conductor lengths, method and apparatus are disclosed for totalizing the conduit length for each conduit size and for totalizing the number and size of conduit fittings by similar pulse generating, gating and counting operations.

PATENTED AUG 24 1971                                3,601,585
SHEET 1 OF 3
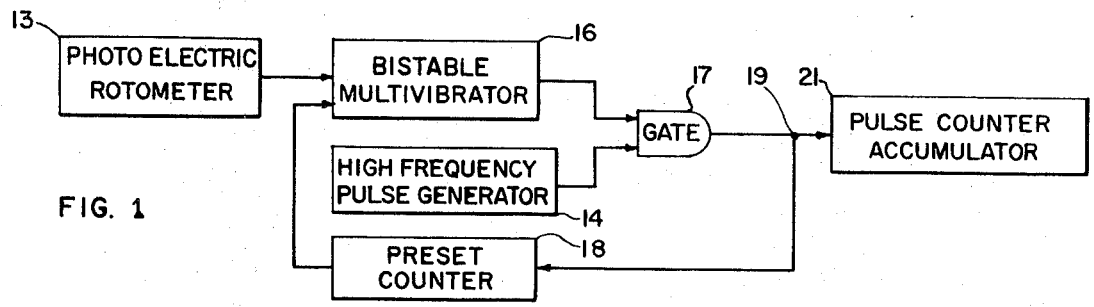
FIG. 1
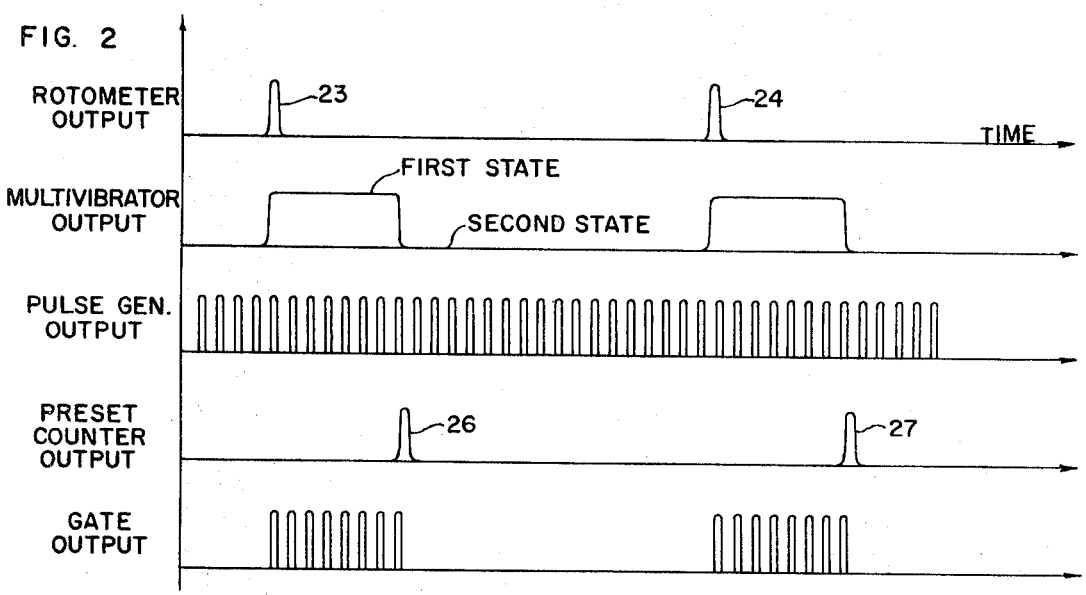
FIG. 2
FIG. 3
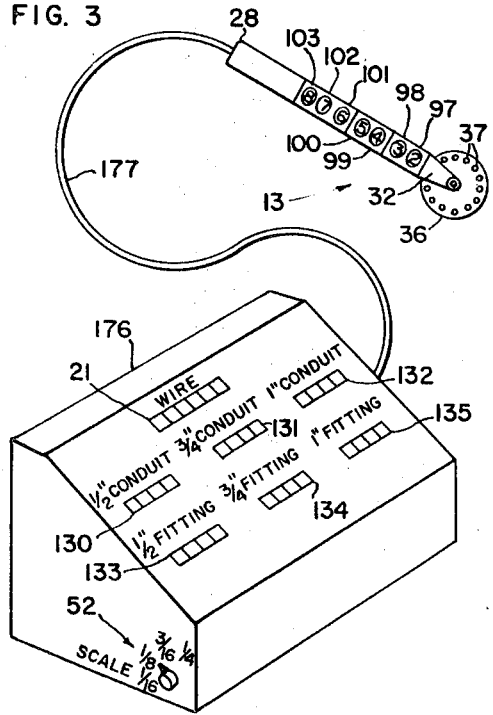
FIG. 4
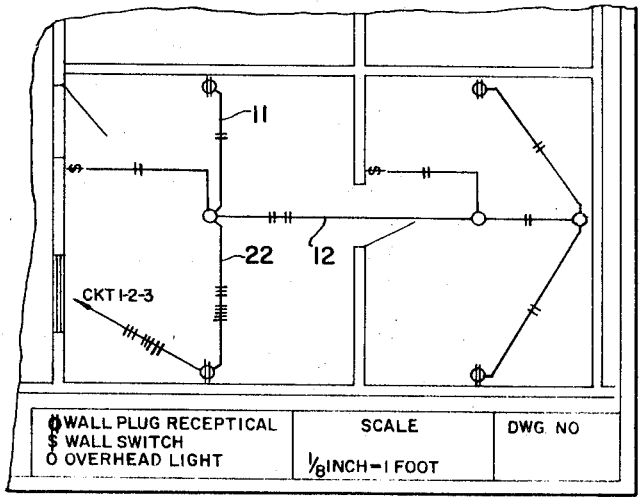
INVENTOR.
DAN B. PAULSEN
BY Warren, Rubin,
Brucker & Chickering
ATTORNEYS

METHOD AND APPARATUS FOR TOTALIZING MATERIALS FROM CONSTRUCTION DRAWINGS

The invention relates to a measurement system and more particularly to method and apparatus for totalizing building materials from a construction drawing such as the total length of wire for the electrical facilities of a designed building.

In estimating a contractor's costs prior to submitting a bid for a construction project, it is essential to prepare a relatively detailed schedule of the total amount of materials to be employed. Taking into account the market of value of the various materials and labor costs, this schedule may then be extended into a reliable cost estimate for use in competitively negotiating for the contract work.

In the case of electrical contractors, negotiating for the electrical installation of a building, the totalizing of materials is referred to as a "takeoff." In essence a "takeoff" involves translating the information provided by the electrical construction drawings into total numerical quantities for each of the electrical facility components. For example, it is desired to account for the total length of the various standard sizes of wire. As the electrical system plans for a building or other construction project are almost universally drawn to scale, the wiring "takeoff" is most conveniently accomplished by measuring the conductor lengths directly from the drawing. The resulting measurements may then be summed and scaled up from the drawing scale notation to arrive at the actual wire length involved. For example, drawing scales are generally one-sixteenth inch (one-sixteenth drawing inch equals 1 foot of the actual building size), one-eighth inch, three-sixteenth inch, one-fourth inch or one-half inch.

It will be apparent that a complete "takeoff" of the electrical system for a large building project can be an extremely tedious and time-consuming operation if accomplished in the foregoing manner. This is particularly true in the case of branch circuits which include all of the wire, conduit and fittings necessary to connect lights, plug receptacles and wall switches for each room of the building. Accordingly, for a majority of projects, estimators abandon the use of such implements as graduated rulers in favor of the use of a rotometer or map measure which ameliorates the "takeoff" time to some degree. A rotometer is a mechanical counter, gear driven by a rotatable wheel, which may be moved along the construction drawing to accumulate conductor or conduit length. As an example of its use, assume that a stretch of conduit shown by a scaled electrical drawing contains three conductors. The rotometer wheel is engaged with the drawing and guided along the conduit run. The rotometer may be fortuitously scaled to match the drawing scale, in which case the number registered by the rotometer counter will indicate the length in feet of the conduit run. More than likely, however, the registered number must be multiplied by an appropriate amount to obtain the length of the conduit in feet. Additionally, the length of wire carried by the conduit can only be obtained by multiplying the conduit length by the number of conductors therein, in this example, by a factor of 3. In this manner, it has been common practice in the art to spend many hours accumulating the entire material requirements for an electrical system, much of the time being absorbed by the estimator's performance of arithmetical adjustments after the measurement of each conduit run. In addition to the undesirable length of time and thus expense required by this estimating procedure, there is a tendency toward unavoidable errors on the part of the estimator which is probably attributable to the tediousness and rather mechanical procedures involved in accomplishing the "takeoff." Such errors can be and many times are extremely costly to the contractor who must base his profit on the accuracy of the "takeoff."

To some extent the above-discussed deficiencies of prior art "takeoff" procedures have been overcome by the development of complex computer programs for use in general purpose computers. In such systems, the computer is adapted to receive the manual takeoff measurements as discussed above and automatically performed the arithmetical manipulations. However, the complex and extensive programming requirements of these general purpose computers results in estimating costs which are attractive only for the largest of construction jobs. Furthermore, even where the contract is large enough to warrant the services of such computerized estimating systems, the savings to the contractor lies more in the accuracy of the resulting "takeoff" than in the cost of the "takeoff" itself.

Accordingly, it is an object of the present invention to provide a method and apparatus for totalizing materials from a construction drawing which is characterized by heretofore unobtainable accuracy, speed and low cost.

It is another object of the present invention to provide a relatively economical method and apparatus for totalizing electrical components from an electrical construction drawing which eliminates the propensity toward human error and greatly decreases the time required to compile such materials.

The invention possesses other objects and features of advantage, some of which of the foregoing will be set forth in the following description of the preferred form of the invention which is illustrated in the drawings accompanying and forming part of this specification. It is to be understood, however, that variations in the showing made by the drawings and description may be adopted within the scope of the invention as set forth in the claims.

In the drawings:

FIG. 1 is a block diagram of the electrical method and apparatus provided by the present invention for totalizing materials from a construction drawing;

FIG. 2 is a graph displaying a series of electrical waveforms occurring at various junctures within the block diagram of FIG. 1;

FIG. 3 is a perspective view of assembled apparatus employed by the present invention;

FIG. 4 is a plan view of a portion of an electrical construction drawing upon which a "takeoff" is performed.

Figure 5:
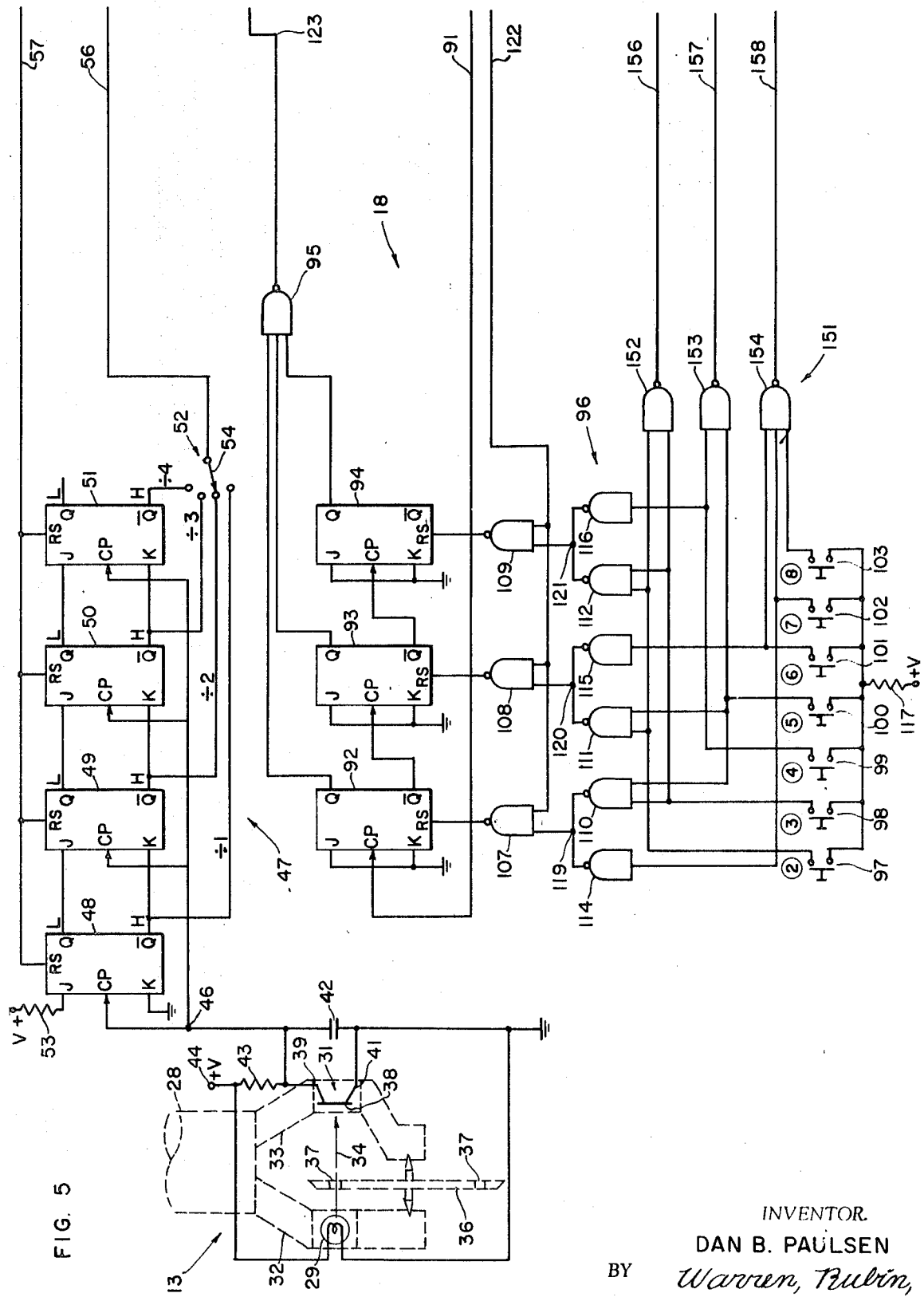
FIGS. 5 and 6 placed end to end show a schematic diagram of the preferred method and apparatus of the invention for totalizing electrical components from an electrical construction drawing.

In general the present invention provides a method and apparatus for totalizing component lengths of multicomponent courses such as the total length of two or more conductors carried within a conduit course or run as represented by an electrical construction drawing. Such a drawing or blueprint is shown in FIG. 4, wherein each of the line segments diagrammatically represent a separate stretch of conduit for connecting the various electrical facilities of the building. For example, conduit run 11 is connected between a wall plug receptacle and an overhead light, both of which are symbolically represented as indicated in the lower margin of the drawing. Additionally, each conduit run contains a designated number of conductors or wires, the number of which is represented by the number of cross lines traversing each of the conduit sections. For example, conduit run 11, contains two conductors while conduit run 12 contains four conductors.

Referring to FIG. 1, in order to measure or totalize the length of conductors in each of the conduit runs, a photoelectric rotometer 13 is provided for converting the length of each conduit run into a proportional number of electrical pulses. Also employed is a constant frequency pulse generator 14 which is adapted to issue a continuous train of electrical pulses having a frequency selected to be substantially greater than the frequency range of pulses produced by rotometer 13. The outputs of rotometer 13 and generator 14 are connected respectively to a bistable multivibrator 16 and an electrical gate 17 which together with a presetable pulse counter 18 form an adjustable pulse gating means for passing or transmitting a selected number of pulses issued by generator 14 to a junction 19 in response to each pulse produced by rotometer 13. A pulse counter accumulator 21 is connected to receive the signal pulses appearing at junction 19 and to accumulate and display the pulse total. By selecting the number of generator pulses passed to junction 19 to be equal to the number of conductors in each conduit run, accumulator 21 functions to display or output a number proportional to the total length of conductors carried by each conduit segment.

For example, assume that it is desired to measure the total conductor length for conduit run 22 of the electrical layout shown by FIG. 4. First, it is noted that run 22 contains eight wires or conductors. Accordingly, counter 18 is set to pass eight pulses to junction 19 and accumulator 21. Rotometer 13 which is also shown in FIG. 3, is thereupon guided along run 22 issuing a number of pulses proportional to the length thereof. Referring to FIG. 2, pulses 23 and 24 represent the resulting rotometer pulse output in this instance. By appropriate construction of rotometer 13 with respect to the scale of the construction drawing, each rotometer output pulse, such as pulses 23 and 24, may represent a foot of actual conduit length. Assuming this is the case, the two rotometer pulses shown by FIG. 2 represent 2 feet of conduit run 22. Multivibrator 16 having first and second output electrical states as shown by FIG. 2 is responsive to each rotometer pulse, such as pulse 23 to assume its first state. Thus, in FIG. 2, the waveform outputs of rotometer 13 and multivibrator 16 drawn to the same horizontal time base illustrates multivibrator 16 going to its first state in response to each of pulses 23 and 24. Electrical gate 17 having two inputs is connected with a first input to the output of multivibrator 16 and with its second input to the output of generator 14. Gate 17 is constructed to pass the pulse train issued by generator 14 while multivibrator 16 is in its first state. Thus, the pulse train output of generator 14 as shown in FIG. 2 drawn to the common time base, is passed to junction 19 by the output of gate 17 during the first state of multivibrator 16. The pulses thereby passed by gate 17 are in turn counted by accumulator 21. Furthermore, the pulses appearing at junction 19 are also fed to an input of preset counter 18 which in turn has an output connected to multivibrator 16 functioning to dispose multivibrator 16 back to its second state in response to passage to counter 18 of a selected number of pulses. As counter 18 has been set to pass eight pulses representing the eight conductors of conduit run 22, counter 18 issues a pulse output, pulses 26 and 27, each time it reaches this count resetting multivibrator 16 to its second state. By this operation, the number of pulses issued by generator 14 occuring during the first state of multivibrator 16 are passed by gate 17 as shown to junction 19 and accumulator 21. For each of rotometer output pulses 23 and 24, eight pulses are received by accumulator 21 for a total of 16 pulses to register 16 feet of conductor or wire length contained in conduit run 22. In this manner, the present invention is adapted for rapidly and accurately totalizing the conductor length for each of the multiconductor conduit runs illustrated by the drawing. The operator or estimator using the present invention merely sets counter 18 for each conduit run to accumulate the desired multiple-conductor length thereof.

In converting the drawing dimensions into a proportional number of electrical pulses, a photoelectric rotometer 13 as best shown in FIGS. 3 and 5, is preferred over other means because of its high speed of response, pulse output resolution and durability under long periods of continuous use. In construction, rotometer 13 comprises a manually transportable mount or handle 28, and a light 29 and phototransistor 31 fastened to opposite bifurcated extensions 32 and 33 of handle 28 to provide a photoelectric means responsive to an intermittent light path 34 to issue electrical pulses. A rotometer wheel 36 is rotatably mounted to extensions 32 and 33 as shown and provided with a plurality of equally spaced circumferential apertures 37. By rotating wheel 36, apertures 37 provide intermittent light path 34 which causes a light receiving base 38 of transistor 31 to periodically respond to light 29 and thereby alternately assume high and low impedance conditions between electrodes 39 and 41. Particularly, in the absence of light impinging upon base 38, transistor 31 assumes a high-impedance condition between electrodes 39 and 41 causing a capacitor 42 connected thereacross to charge to the full voltage source V+. This operation follows from the connection of the junction of electrode 41 and capacitor 42 to ground and the connection of the junction between electrode 39 and capacitor 42 through a resistor 43 to terminal 44 adapted to receive a source of potential V+. So long as transistor 31 remains in a high-impedance condition, a negligible amount of current flows through resistor 43 and thus the junction of electrode 39 and capacitor 42 assumes the potential at terminals 44 which is V+. On the other hand, when wheel 46 is engaged with and moved over the drawing of FIG. 4, apertures 37 periodically transmit light via path 34 which impinges upon base 38 causing transistor 31 to assume a very low impedance between electrodes 39 and 41. As this occurs, the voltage across capacitor 42 drops to issue a low going voltage pulse to junction 46 which forms the output of rotometer 12.

In the construction of rotometer wheel 36, apertures 37 are preferably spaced one-sixteenth of an inch apart such that movement of the wheel across the drawing produces an output pulse at junction 46 every one-sixteenth drawing inch. This permits convenient scaling between the pulse count provided by accumulator 21 and the number of conductor feet as represented by the electrical construction drawing. As most drawings are scaled to either one-sixteenth of an inch per foot, one-eighth of an inch per foot, three-sixteenth of an inch per foot or one-fourth inch per foot, the one-sixteenth inch per foot pulse output of rotometer 13 may be conveniently divided to match the particular drawing scale. For example, assuming the drawing scale is one-eighth of an inch per foot, the rotometer pulse output is divided by 2 resulting in a pulse for every one-eighth inch as desired. In a similar manner, the rotometer pulse output for a three-sixteenth inch per foot scale drawing will be divided by 3 and the pulse output for a ¼-inch drawing per foot scale will be divided by 4. As discussed herein, this preferred scale-changing feature is provided by an adjustable pulse division circuit 47 as shown in FIG. 5.

In the presently preferred form of the invention, the pulse output of rotometer 13 is fed through a pulse frequency changing means in this instance frequency-dividing circuit 47 before introduction into bistable multivibrator 16. As shown in FIG. 5, circuit 47 comprises a set of four conventional J-K flip-flop devices 48, 49, 50 and 51 connected to provide between junction 46 and a scale selection switch 52, division of the pulses issued by rotometer 13 by factors of 1, 2, 3, or 4. By virtue of this operation, switch 52 may be selected to match drawing scales of one-sixteenth inch per foot, one-eighth inch per foot, three-sixteenth inch per foot or one-fourth inch per foot.

Each of J-K flip-flops 48–51 include inputs J, CP and K; outputs Q and Q̄ [read as not Q]; and a reset RS. By connecting the J input of flip-flop 48 through a resistor 53 to V+ and connecting the K input of flip-flop 48 to ground as shown, and connecting each of Q and Q̄ outputs of each flip-flop respectively to the J and K inputs of a succeeding flip-flop as shown, circuit 47 is adapted to provide the desired pulse division. Particularly, junction 46 or the output of rotometer 13 is fed jointly to the CP inputs of each of flip-flops 48–51 and the Q output of each flip-flop is connected individually to one of the contacts of switch 52. By this construction, the Q output of flip-flop 48 responds to a first low going pulse appearing at junction 46 to switch from a normally high voltage level, to a low voltage or ground condition.

As used in here, the terms high and low logic states refer respectively to a positive voltage and a zero voltage or ground potential. The term logic inverter refers to a device which inverts the logic state between its input and output.

The Q̄ output of flip-flop 49 responds to two negative going pulses at junction 46 to switch from a normally high level to a low voltage condition. The Q̄ output of flip-flop 50 responds to three such pulses to switch from a high to a low condition and similarly the Q̄ output of flip-flop 51 responds to four such pulses to change from its normally high state to a low condition. Thus, in order to divide the pulse output of rotometer 13 by a factor of 2 a wiper arm 54 of switch 52 is connected to the $\bar{Q}$ output of flip-flop 49 as shown, whereby two consecutive pulses provided by the rotometer will cause a line 56 connected to wiper arm 54 to switch from a high-voltage level to a low-voltage condition. In this manner, line 56 provides a signal representing the divided pulse output of rotometer 46. As discussed herein, the $\bar{Q}$ outputs of each flip-flops 48–51 are reset to their normally high voltage condition by a signal received over a line 57 connected jointly to the RS inputs of each flip-flop. The reset occurs each time line 56 changes from a high-voltage condition to a low-voltage condition representing the divided pulse output. In a device constructed in accordance with the present disclosure, Fairchild 9923 J-K flip-flops may be employed and are available from Fairchild Semiconductor Mountain View, Cal.

Figure 6:
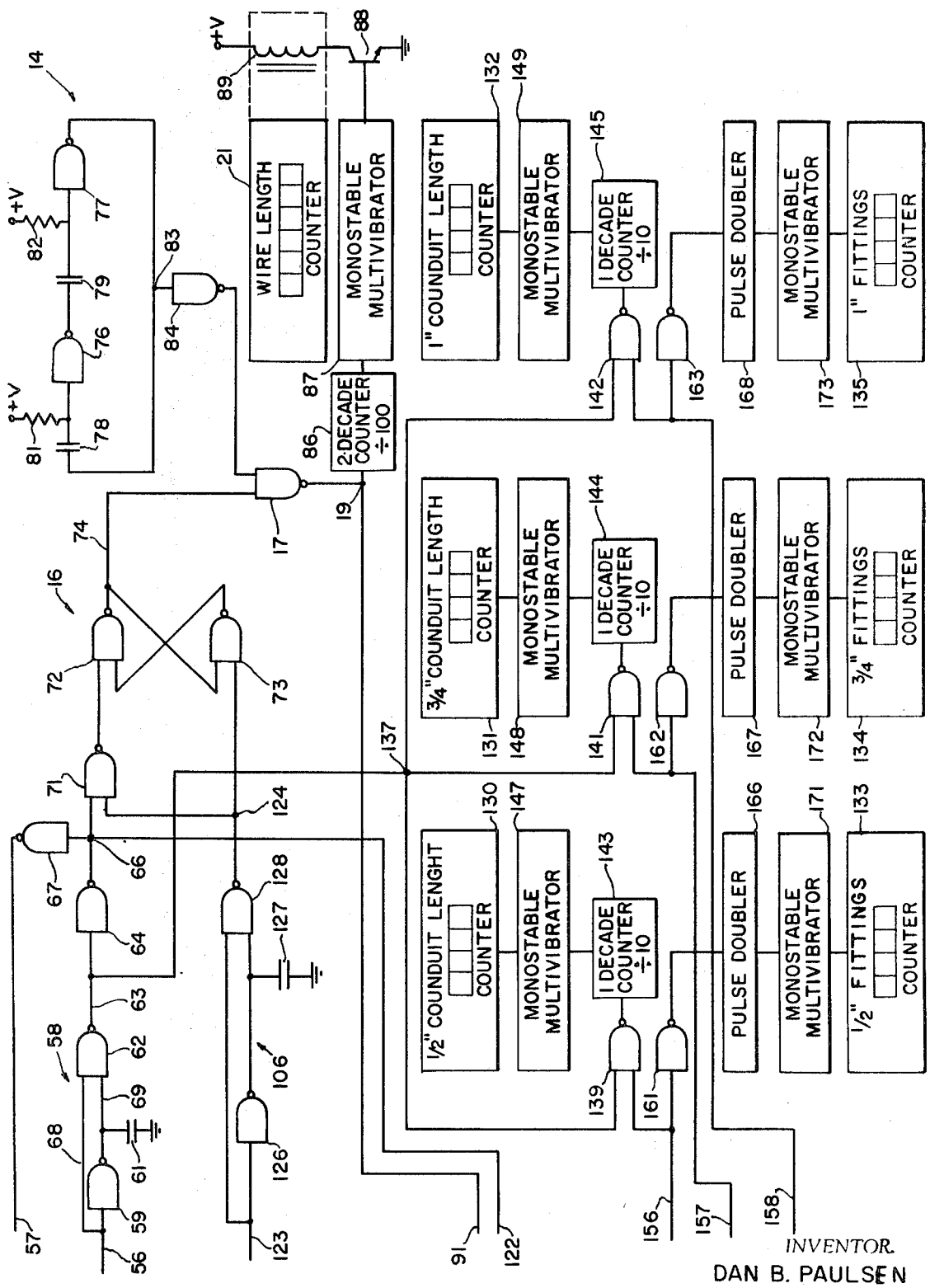

Referring to FIG. 6, line 56 providing a series of high- to low-voltage signal transitions selectively scaled to the number of pulses issued by rotometer 13, is fed through a monostable multivibrator 58 to convert such voltage transitions into a voltage pulse having a predetermined width. Particularly, monostable multivibrator 58 comprising an inverter 59, a capacitor 61 and a NAND gate 62 is responsive to a high- to low-voltage transition on line 56 to issue a positive going voltage pulse at an output 63 thereof. The voltage pulse output thereby provided is fed through a logic inverter 64 to a junction 66 such that junction 66 receives a low going pulse in response to each signal transition provided by pulse dividing circuit 47. Junction 66 is in turn connected through another inverter 67 back to line 57 to reset flip-flops 48–51 as discussed above.

By virtue of this operation, junction 66 receives a low going pulse for each group of multiple pulses issued by rotometer 13, wherein the number of pulses in each such group is selected by scale switch 52.

The operation of a monostable multivibrator constructed with a logic inverter, capacitor and NAND gate such as multivibrator 58 shown in FIG. 6 is well known in the art. Briefly, however, NAND gate 62 performs the logical NAND function and thus assumes a high voltage at its output, corresponding to output 63, only in response to both of its inputs being in a low-voltage or grounded condition. Thus, immediately prior to line 56 assuming a low-voltage condition, input 68 of gate 62 is high while input 69 of gate 62 is low due to the operation of inverter 59. In this condition, the output of gate 62 is high. As the voltage on line 56 exhibits its transition to the low condition in response to the output of pulse division circuit 47, input 68 assumes a low-voltage condition, while input 69 remains also in a low-voltage condition due to the energy storage characteristics of capacitor 61. Thus the output of gate 62, output 63, goes to a high voltage state. Eventually, the voltage stored by capacitor 61 is dissipated by leakage through input 69 to gate 62 and the output of inverter 63 is again low. The discharge of capacitor 61 thus determines the width of the high going pulse issued by output 63.

In this instance, logic inverter 59 is provided by employing a single input of a NAND gate such as gate 62. This operation follows from the above description of NAND gate 62, wherein a high voltage at either input causes the output to assume a low voltage logic condition. In this manner, inverter 59 embodied by a single input NAND gate provides a high-low logical inversion between its input and output.

In a like manner, inverters 64 and 67 are provided by employing a single input of a NAND gate.

The series of negative going pulses appearing at junction 66 are thereupon fed through a first input of a NAND gate 71 to bistable multivibrator 16. Accordingly, the output of gate 71 corresponds to the output of rotometer 13 as shown in FIG. 1 with the exception that the pulses issued by gate 71 have been scaled down in number from the pulses issued by rotometer 13 in response to circuit 47. Multivibrator 16, comprising a pair of interconnected NAND gates 72 and 73, responds to a high going pulse issued by gate 71 in response to a low going pulse at junction 66 to assume a first state, such as shown in FIG. 2. In particular, NAND gate 72 having a first input connected to the output of NAND gate 71 and a second input connected to the output of NAND gate 73 is responsive to the pulse output of gate 71 to assume a low-voltage condition at output 74. Multivibrator 16 remains in this first state condition until it is reset to its second state as discussed herein.

As discussed in relation to FIG. 1, gate 17 which in this instance is provided by a NAND gate as shown in FIG. 6, functions in response to multivibrator 16 to pass the constant frequency output of pulse generator 14 to a junction 19. Specifically, as output 74 of multivibrator 16 which is connected to a first input of NAND gate 17 assumes a low-voltage condition, the constant frequency pulse train output of generator 14 connected to a second input of NAND gate 17 is passed to junction 19 for eventual accumulation as discussed above.

In the presently preferred embodiment, generator 14 comprises a pair of inverters 76 and 77, provided by single input NAND gates as in the case of inverter 59, interconnected capacitors 78 and 79 and resistors 81 and 82 each having one end connected to voltage source V+. By this construction, an astable or free running multivibrator is formed, producing a constant frequency train of high going pulses at a junction 83. The pulse train thus provided is fed through an inverter 84 to the second input of NAND gate 17 issuing a train of low going constant frequency pulses thereto for passage by gate 17 to junction 19 during the low-voltage condition output of multivibrator 16.

As the number of pulses pass by gate 17 in response to each output pulse from monostable multivibrator 58 corresponds to the number of conductors or wires in each conduit run of the electrical drawing, the frequency of the pulse output from generator 14 must be adequately high. For example, as described in the relationship to FIG. 2, generator 14 must have a frequency such that at least eight pulses occur between rotometer output pulses 23 and 24. By this requirement, the length of wire carried by an eight-conductor conduit run may be accurately totalized. If it is desired to totalize the wire length for conduits containing more than eight conductors, the frequency of pulse generator 14 should appropriately be increased.

In selecting the frequency of generator 14 as above described, it will be appreciated that the duration between consecutive pulses issued by rotometer 13 will vary in accordance with the speed at which wheel 36 is moved over the construction drawing. Additionally, the response speed of accumulator 21 should be taken into account, keeping the frequency of pulse generator 14 within the capability range thereof. Considering these various factors, it has been found preferable to operate generator 14 between 10,000 and 15,000 cycles per second for the circuitry described herein.

Referring to FIG. 6, the sequence of pulses appearing at junction 19 are fed through a two decade counter 86 to a monostable multivibrator 87, which is connected to drive accumulator 21, which in this instance is an electromechanical counter, by means of transistor 88 and solenoid 89.

Multivibrator 87 may be constructed in a manner such as monostable multivibrator 58 and functions to convert the signal output of counter 86 into a distinct short duration pulse for driving transistor 88 which in turn operates solenoid 89 for increasing the count on accumulator 21. The electromechanical counter for accumulator 21 is a commercially available device of well known construction and operation, Veeder Root Company being one commercial source.

Two decade counter 86 functions to count 100 pulses before issuing a signal to multivibrator 87 and thus performs a divide by 100 operation on the pulse count appearing at junction 19. Any number of conventional pulse counters may be employed for counter 86, such as a pair of Fairchild 9958 decade counters available from the above-noted Fairchild Semiconductor Company.

The purpose of two decade counter 86 in the present embodiment is to scale down the pulse output appearing at junction 19 to a frequency level within the response speed of economical electromechanical counters as used herein. More expensive but faster operating electronic pulse counters may be employed if desired in which case two decade counter 86 would be unnecessary.

The pulse output at junction 19 is also fed by means of a line 91 to preset counter 18 comprised of a set of three J-K flip-flops 92, 93 and 94; a three input NAND gate 95; all of which are connected to encoding switching circuit 96; and a set of manually operable switches 97, 98, 99, 100, 101, 102 and 103. Encoding circuit 96 is responsive to the manually operable switches to set J-K flip-flops 92–94 to a condition for responding to a selected number of pulses issued at junction 19. Each time the desired pulse count is reached by accumulators 92–94, an output signal is issued by gate 95 to a monostable multivibrator 106 which resets multivibrator 16 to its second state terminating the transmission of pulses by gate 17. As above described, this operation permits selective pulse count accumulation in accordance with the number of conductors in each conduit run.

J-K flip-flops 92–94 are 92–same basic components as J-K flip-flops 48–51 and correspondingly have the same commercial availability. At variance with pulse dividing circuit 47, however, flip-flops 92–94 are connected in a manner to provide selective maximum counts up to 8.

As shown, each of the J and K inputs of flip-flops 92–94 are connected to ground or a logical low-voltage state. The Q outputs of the flip-flops are fed to a three-input NAND gate 95 which functions to issue a logical high-voltage signal when all of the Q outputs assume a logical low-voltage condition. The output pulses from junction 19 are fed over line 91 to the CP or clock pulse input of flip-flop 92 which causes the Q and $\overline{Q}$ outputs thereof to switch logical states in response to each input clock pulse. The CP inputs of each of flip-flops 93 and 94 are respectively connected to the $\overline{Q}$ outputs of flip-flops 92 and 93.

Encoding circuit 96 is formed by a plurality of two input NAND gates 107, 108, 109, 110, 111 and 112 and a plurality of logic inverters 114, 115 and 116. The inputs of gates 110, 111 and 112 and the inputs of inverters 114, 115 and 116 are connected to selectively receive a high voltage logic signal, V+ through resistor 117 and certain of switches 97–103 to provide at junctions 119, 120 and 121 a desired combination of logical voltage signals for presetting flip-flops 92 –94 to a desired maximum count. This is accomplished in particular by NAND gates 107, 108 and 109 which have a first input responsive to the instantaneous logical condition of junctions 119, 120 and 121, respectively to selectively pass the negative going pulses appearing at junction 66 of FIG. 6 over a line 122 to the RS inputs of flip-flops 92–94. The particular combination of logic conditions for junctions 119, 120 and 121 is shown in the following chart for each setting of counter 18 between counts of 2 to 8.

CHART A

| Count | Junction 119 | Junction 120 | Junction 121 |
|---|---|---|---|
| 2 | H = High | L = Low | L = Low |
| 3 | L | H | L |
| 4 | H | H | L |
| 5 | L | L | H |
| 6 | H | L | H |
| 7 | L | H | H |
| 8 | H | H | H |

To provide the above selective logic conditions for presetting counter 18, the operator selectively closes one of switches 97–103 which correspond respectively to one conductor counts 2–8. Thus, if it is desired to totalize a two conductor conduit run such as conduit run 11 shown in FIG. 4, the operator depresses switch 97. For a count of four corresponding to a four conductor conduit run such as run 12, shown in the drawing of FIG. 4, the operator depresses switch 99.

With all of switches 97–102 in a open or unoperated condition, counter 18 is preset to count to a maximum of eight before resetting multivibrator 16. Switch 103 while corresponding to a count of eight does not enter into the operation of counter 18 and is used for another purpose as described herein. Thus with switches 97–102 in an open condition, junctions 119, 120 and 121 assume a high-voltage logic condition (H) in accordance with the above chart for a count of eight. In this state, NAND gates 107, 108 and 109 block the passage of reset pulses appearing on line 122 from junction 66. Thus, flip-flops 92, 93 and 94 cycle through the maximum count of eight before the Q outputs thereof assume the appropriate logical condition for resetting multivibrator 16 by means of NAND gate 95 and monostable multivibrator 106.

For the count to 2 switch 97 is depressed connecting V+ to one of the inputs of each of NAND gates 111 and 112 thereby rendering junctions 120 and 121 to assume a logical low condition in conformance with the above chart. In this state, gates 108 and 109 are enabled to pass the low going pulses issued over line 122 to the RS inputs of flip-flops 93 and 94 resetting the Q and $\overline{Q}$ outputs to a logic condition providing a total count of two pulses on line 91 before multivibrator 16 is reset.

By closing switch 98, one of the inputs of both gate 110 and 112 receives a high logic condition, thereby rendering junctions 119 and 121 in a low logic state and maintaining junction 120 in a high logic condition for a count of three.

Operation of switch 99, places the input to inverter 116 in a high condition causing the output thereof and junction 121 to assume a low logic state, while junctions 119 and 120 remain high for a count of four.

Switch 100 connected to one of the inputs of both gates 110 and 111 operates to dispose junctions 119 and 120 in a low logic condition when depressed and leaves junction 121 in a high condition for a count of five.

For a count of six, switch 101 is connected to the input of inverter 115 causing 120 to assume a low condition while junctions 119 and 121 remain high for a count of six.

For a count of seven, switch 102 is connected to the input of inverter 114 for placing junction 119 in a low logic condition with junctions 120 and 121 remaining high for a count of seven.

By virtue of this operation, for a count of two, flip-flops 93 and 94 are reset by each pulse appearing at junction 66 of FIG. 6. For a count of three, flip-flops 92 and 94 are reset by each such pulse. For a count of four, flip-flop 94 is reset. For a count of five, flip-flops 92 and 93 are reset. For a count of six, flip-flops 93 is reset. For a count of seven, flip-flop 92 is reset and for a count of eight, none of the flip-flops are reset. This forms eight possible logical signal combinations at the $\overline{Q}$ outputs of flip-flops 92–94.

NAND gate 95 functions in response to the Q outputs of flip-flops 92, 93 and 94 to issue over a line 123 a logic signal transition from a high to a low state each time counter 18 reaches the preset count. Particularly, this signal transition occurs between a logic state when the Q outputs of flip-flops 92–94 are all low and the final or maximum count pulse drives one or more of the Q outputs to a high logic state. This logic sequence is transformed by the NAND logic function of gate 95 into a signal transition on line 123 from high to low.

Monostable multivibrator 106 responds to this signal transition on line 123 to issue a low going short duration pulse to junction 124. This operation is similar to that of monostable multivibrator 58 responding to the signal transition on line 56 as discussed above and serves to shape the output of preset counter 18 into a short duration pulse appropriate for resetting bistable multivibrator 16. Monostable multivibrator 106 is comprised of a logic inverter 126, a capacitor 127 and a NAND gate 128 interconnected and operating in the same manner as multivibrator 58.

Junction 124 connected to one of the inputs of NAND gate 73 of multivibrator 16, causes output 74 to assume a logical low-voltage condition or the second state of multivibrator 16 as shown in FIG. 2 in response to each pulse appearing at junction 124. As this occurs, gate 17 is disposed in a nontransmitting condition thereby cutting off the pulse output of generator 14 from junction 19 upon reaching the preset pulse count. Junction 124 is also connected to a second input of NAND gates 71 which serve to prevent multivibrator 16 from being set back to its first logic state during the pulse output appearing at junction 124.

It will be apparent from the foregoing disclosure that preset counter 18 provides a means responsive to manually operable switches 97–102 for gating or transmitting a preselected number of high frequency pulses provided by generator 14 to accumulator 21. With scale selection switch 52 set in the divide-by-one position, this gating sequence occurs in response to each rotometer output pulse. With switch 52 set in the divide-by-two position, this gating sequence occurs for every two output pulses from rotometer 13, etc. Thus, rapid and automatic "takeoff" accumulation is achieved by first setting switch 52 to a desired scale and then depressing one of switches 79–102 for the desired number of conductors in any given conduit run, and manipulating rotometer 13 whereby accumulator 21 registers a count proportional to the total conductor length.

As a preferred feature of the invention, means are provided for automatically accumulating or totalizing conduit length and conduit fittings for each of several common conduit diameters. For this purpose, additional electromechanical counters 130, 131 and 132 are provided for registering the length of ½-inch, ¾-inch and 1-inch conduit runs. For totalizing the number of fittings employed at each terminal end of the conduit runs, electromechanical counters 133, 134 and 135 are employed. The fitting size, of course, corresponds to the diameter dimension of the associated conduit to which the fittings are attached.

As described herein, counters 130, 131 and 132 are advantageously connected in such a manner to separately register the conduit length for each size thereof automatically in response to the selection by switches 97–103 of the number of pulses transmitted by gate 17 corresponding to the number of conductors in each conduit run. In a similar manner, counters 133, 134 and 135 automatically register separate amounts corresponding to the number of fittings for each conduit size.

For accumulating the conduit length as opposed to the total conductor length carried by the conduit, the scaled pulse output from rotometer 13 is employed directly, wherein the output of monostable multivibrator 58 is connected over a line 136 to a junction 137 to which each of counters 130, 131, and 132 are connected through separate gating circuitry. Particularly, NAND gates 139, 141 and 142 each having one of their inputs connected to junction 137 provide means for feeding the scaled pulse output from rotometer 13 to only a certain selected one of counters 130, 131 and 132 in response to operation of switches 97–103. The outputs of each of gates 139, 141 and 142 are connected to the associated electromechanical counters by means of one decade counters 143, 144 and 145 and monostable multivibrators 147, 148 and 149. One decade counters 143, 144 and 145 are employed to divide the pulse signal output of each of gates 139, 141 and 142 by a factor of 10 and consists of a single decade pulse counter such as Fairchild 9958 decade counter. Monostable multivibrators 147, 148 and 149 function to convert the signal outputs of the decade counters into a short duration pulse suitable for actuating the electromechanical counters and may be constructed in a manner such as monostable multivibrators 58. While not shown, the output of multivibrators 147, 148 and 149 may be connected through a driving transistor for operating the electromechanical drive of counters 130, 131 and 132 as in the case of monostable multivibrator 87, transistor 88 and solenoid 89 discussed above in regard to accumulator 21.

In order to enable gates 139, 141 and 142 to transmit the pulse signal appearing at junction 137 to counters 130, 131 and 132, a second input of these gates are connected through an encoding switching circuit 151 to manually operate switches 97–103. Encoding circuit 151 consisting of NAND gates 152, 153 and 154 functions to selectively actuate gates 139, 141 and 142 in response to the closure of certain of switches 97–103. By virtue of this operation, the length of conduit for each size thereof may be separately accumulated automatically in response to the number of conductors in each conduit run as indicated by an operator's actuation of one of switches 97–103.

In order to appreciate the advantage of this above-described operation, reference is made to standard electrical construction code requirements. As provided by many of these codes, a given maximum number of conductors is designated for a given size conductor and conduit diameter. For example, a ½-inch-diameter conduit may carry a maximum of three No. 12 wires. A ¾-inch conduit takes a maximum of five No. 12 wires. And a 1-inch-diameter conduit takes a maximum of eight No. 12 wires. Accordingly, a ½-inch conduit will take four or five conductors, and a 1-inch conduit takes six, seven or eight conductors. The code for No. 12 wire is used in this instance as this is the most common size wire for electrical facilities.

Referring to FIGS. 5 and 6, encoding circuit 151 together with gates 139, 141 and 142 functions to totalize the length and size of conduits in accordance with the above code requirements as the number of conductors for any given conduit run is selected by means of switches 97–103.

In operation, gate 152 responds to the selection of either two or three conductors for any given conduit run and in response thereto assumes a low logic output condition. The output of gate 152 is fed over a line 156 to a second input of gate 139 which enables gate 139 to pass the rotometer pulse output appearing in junction 137 to counter 130 through one decade counter 143 and monostable multivibrator 147.

For a conduit run having four or five conductors, gate 153 responds to the depression of either of manually operated switches 99 or 100 to issue a low logic voltage over a line 157 to a second input of gate 141. Gate 141 responds thereto passing the scaled rotometer output pulses to counter 131.

In a similar manner, gate 154 responds to closure of either switches 101, 102 or 103 representing six, seven or eight conductors, actuating gate 142 via a line 158. Counter 132 thereupon registers a scaled pulse count from rotometer 13.

Accordingly, for a pulse output from monostable multivibrator 58 equaling one pulse per actual construction foot, counter 130 registers a number equal to one-tenth the number of ½-inch conduit feet, or counter 131 registers a number equaling one-tenth of the number of ¾-inch conduit feet or counter 132 similarly registers a number equaling one-tenth of the number of 1-inch conduit feet.

For totalizing the size and number of fittings, the gating signals provided by encoding circuit 151 are individually fed through logic inverters 161, 162 and 163, pulse doublers 166 167 and 168 of well-known construction and operation and monostable multivibrators 171, 172 and 173 to counters 133, 134 and 135. In operation, as an operator actuates one of switches 97–103 as an individual conduit run is traced in the drawing as shown in FIG. 4, a single pulse will appear on one of lines 156, 157 and 158. This pulse will have a leading edge corresponding with the depression of one of switches 97–103 and a trailing edge corresponding to the release of such switch. For example, assuming the operator is totalizing conduit run 11 as shown in FIG. 4, he will depress switch 97 corresponding to the two conductors carried thereby and trace the length of the run with wheel 36 of rotometer 13. In response thereto, line 156 connected to the output of gate 152 will receive a single pulse having a duration bounded by the depression and subsequent release of switch 97. Pulse doubler 166 responds to this pulse through inverter 161 and issues a pair of pulses to monostable multivibrator 171 which drives counter 133. Accordingly, each time either switch 97 or 98 is actuated, counter 133 registers a count of two, corresponding to two one-half inch fittings for a single of ½-inch conduit run.

In a similar manner, counter 134 responds to each actuation of switch 99 or 100 to register a count of two by means of gate 153, line 157, inverter 162, pulse doubler 167 and multivibrator 172. Counter 135 responds to each actuation of switches 101, 102 or 103 to totalize two 1-inch fittings by means of gate 154, line 158, inverter 163, pulse doubler 168 and multivibrator 173.

By virtue of the foregoing operation, an estimator may totalize wire length, conduit size and length and the size and number of fittings by simple and rapid manipulation of a single set of switches 97–103.

Referring to FIG. 3, further convenience and rapidity of operation are obtained by mounting switches 97–103 within handle 28 of photoelectric rotometer 13. In this manner, the operator has in one hand all the necessary controls for accumulating the electrical installation components for a given construction drawing. Each of the counters may be mounted on the display panel of a console 176 having a size sufficient to contain the electronic circuitry. Scale selection switch 52 may be mounted at a convenient location on console 176 as shown. The electrical connections serving switches 97–103 and rotometer 13 may be carried by a flexible cord 177.

In construction a measuring apparatus in accordance with the preferred embodiments disclosed herein, each of the NAND gates and logic inverters may be provided by a number of dual two-input NAND gates such as supplied by Fairchild Semiconductor Corporation under Part No. ML 9914. This module consists of two separate two-input NAND gates which may be used to provide gates 58, 71, 72, 73, 17, 107–112, 139–142, 152 and 153. By connecting the outputs of two NAND gates and using three of the four inputs thereby provided, NAND gates 95 and 154 are conveniently obtained. Using a single input of each such Fairchild NAND gate, logic inverters 59, 64, 67, 76, 77, 84, 126, 114–116, and 161–163 are provided.

I claim:

1. Measuring apparatus for totalizing construction materials including the conductor length of multiconductor conduits and the conduit length for each of a plurality of conduit sizes and the total number of conduit fittings from a scaled construction drawing, the combination comprising:
   first means adapted for movement over the drawing for converting distance thereby traveled into a proportional number of first electrical pulses,
   a pulse generator issuing second electrical pulses of frequency higher than the frequency of said first pulses, pulse-counting means,
   gating means connected to and controlled by said first means and connecting said generator to said counting means and passing a selected number of second pulses to said counting means in response to each first pulse,
   manually operably switching means connected to said gating means for setting the selected number of pulses passed thereby to represent the total length of all conductors carried by each conduit,
   an additional pulse-counting means for each conduit size,
   second gating means connected to said switching means and said additional counting means and said first means for passing the pulses issued by said first means to selected of said additional counting means in response to said switching means,
   a third pulse-counting means for each fitting size, and
   pulse doubler means connected between said second gating means and said last-named additional counting means issuing a pair of pulses to certain of said last-named counting means in response to operation of said gating means.

2. The method of totalizing component lengths of multicomponent courses provided by a scaled construction drawing including conduit runs, conductors carried within the conduits represented by such runs and wherein each conduit run shown by the drawing includes a pair of conduit fittings at the terminal ends thereof, comprising:
   converting the length of each course into a proportional number of first electrical pulses,
   generating a second pulse during the converting operation for each conduit run,
   doubling each such second pulse to provide a pair of pulses for each run,
   counting each pulse provided by said doubling operation to register a total number of fittings,
   generating a continuous train of third electrical pulses having a frequency greater than that of said first pulses, transmitting a selected number of said third pulses proportional to the number of components in each course in response to each first pulse, and
   counting said transmitted pulses to provide a number proportional to the total length of the components.

3. The method defined in claim 2, said converting step further comprising selectively changing the frequency of the first electrical pulses in proportion to the drawing scale.

4. The method of totalizing component lengths of multicomponent courses including conduit runs displayed by a scaled construction drawing, conductors carried within the conduit represented by such runs wherein the size of the conduit of each run is dependent on the number of conductors carried thereby and wherein each conduit run includes a pair of fittings of a size corresponding to the conduit size of each run, comprising:
   converting the length of each course into a proportional number of first electrical pulses,
   generating a continuous train of second electrical pulses having a frequency greater than that of said first pulses, transmitting a selected number of said second pulses proportional to the number of components in each course in response to each first pulse,
   counting said transmitted pulses to provide a number proportional to the total conductor length,
   separately counting the first pulses for each size of conduit by automatically gating such first pulses to selected separate counting means in response to the selection of the number of pulses to be transmitted by said transmitting operation,
   generating a third pulse during the converting operation for each conduit run,
   doubling each of said third pulses to provide a pair of pulses for each conduit run, and
   separately counting the pulses provided by said doubling operation for each conduit size automatically in response to the selection of the number of pulses to be transmitted by aforesaid transmitting operation to register a total number of fittings for each size thereof.

5. The method defined in claim 4, said converting step further comprising selectively changing the frequency of the first electrical pulses in proportion to the drawing scale.

6. Measuring apparatus for totalizing construction materials from a construction drawing, including the conductor length of multiconductor conduits and the total number of conduit fittings represented by a scaled electrical construction drawing, the combination comprising:
   first means adapted for movement over the drawing for converting distance thereby traveled into a proportional number of first electrical pulses,
   a pulse generator issuing second electrical pulses of frequency higher than the frequency of said first pulses, pulse-counting means,
   gating means connected to and controlled by said first means and connecting said generator to said counting means and passing a selected number of second pulses to said counting means in response to each first pulse, adjustable pulse frequency changing means connected between said first means and said gating means and responsive to said first pulses to issue a proportional number of pulses to said gating means whereby the apparatus may be adjusted to accommodate different construction drawing scales, manually operable switching means connected to said gating means for setting the selected number of pulses passed by said gating means to represent the total length of all conductors carried by each conduit, and an additional pulse-counting means for each fitting size, and pulse doubler means connected between said gating means and said last-named additional counting means issuing a pair of pulses to certain of said last-named counting means in response to the operation of said gating means.

UNITED STATES PATENT OFFICE
CERTIFICATE OF CORRECTION

Patent No. 3,601,585     Dated  August 24, 1971

Inventor(s)  DAN B. PAULSEN

It is certified that error appears in the above-identified patent and that said Letters Patent are hereby corrected as shown below:

Column 4, line 17, change "12" to --13--.

Column 4, line 53, change "Q and Q" to --Q and $\bar{Q}$--;

line 56, change "Q and Q" to --Q and $\bar{Q}$--; line 60, change "Q" to --$\bar{Q}$--; line 62, change "Q" to --$\bar{Q}$--.

Column 5, line 17, after "Semiconductor", insert --,--.

Column 7, line 24, change "are 92-" to --are the--.

Column 10, line 24, after "will take", insert --one, two or three conductors, a 3/4-inch conduit will take--.

Signed and sealed this 6th day of June 1972.

(SEAL)
Attest:

EDWARD M. FLETCHER, JR.
Attesting Officer

ROBERT GOTTSCHALK
Commissioner of Patents